(12) United States Patent
Ivashyn

(10) Patent No.: US 10,257,341 B2
(45) Date of Patent: Apr. 9, 2019

(54) USING A SMARTPHONE FOR REMOTE INTERACTION WITH VISUAL USER INTERFACES

(71) Applicant: EBAY INC., San Jose, CA (US)

(72) Inventor: Ievgenii Ivashyn, Kiev (UA)

(73) Assignee: eBay Inc., San Jose, CA (US)

( * ) Notice: Subject to any disclaimer, the term of this patent is extended or adjusted under 35 U.S.C. 154(b) by 309 days.

(21) Appl. No.: 14/069,725

(22) Filed: Nov. 1, 2013

(65) Prior Publication Data
US 2015/0127714 A1 May 7, 2015

(51) Int. Cl.
| | | |
|---|---|---|
| H04L 29/06 | (2006.01) | |
| H04M 1/725 | (2006.01) | |
| G06F 21/41 | (2013.01) | |
| G06F 21/42 | (2013.01) | |
| H04W 12/06 | (2009.01) | |
| H04W 4/80 | (2018.01) | |
| H04M 1/67 | (2006.01) | |
| H04W 4/00 | (2018.01) | |

(52) U.S. Cl.
CPC ........ *H04M 1/72561* (2013.01); *G06F 21/41* (2013.01); *G06F 21/42* (2013.01); *H04W 12/06* (2013.01); H04L 63/0853 (2013.01); H04M 1/67 (2013.01); H04W 4/008 (2013.01); H04W 4/80 (2018.02)

(58) Field of Classification Search
CPC ............ H04L 29/08072; H04L 29/06; H04L 29/0809; H04L 29/06047; G06Q 30/02
See application file for complete search history.

(56) References Cited

U.S. PATENT DOCUMENTS

| | | | |
|---|---|---|---|
| 8,519,820 B2 | 8/2013 | Cannistraro | |
| 8,627,438 B1* | 1/2014 | Bhimanaik | H04L 63/10 |
| | | | 726/9 |
| 9,330,198 B1* | 5/2016 | Campbell | G06F 3/0484 |
| 2009/0070142 A1* | 3/2009 | Morita | G06Q 10/10 |
| | | | 705/3 |
| 2011/0137742 A1* | 6/2011 | Parikh | G06Q 20/04 |
| | | | 705/26.1 |
| 2011/0320343 A1* | 12/2011 | Koh | G06Q 20/10 |
| | | | 705/39 |
| 2014/0032320 A1* | 1/2014 | Sivaraman | 705/14.54 |

* cited by examiner

*Primary Examiner* — Vivek Srivastava
*Assistant Examiner* — Hien V Doan
(74) *Attorney, Agent, or Firm* — Wolfe-SBMC

(57) ABSTRACT

Methods and systems are provided for establishing an interaction session between a visual interface on any of a wide range of devices (e.g., POS, ATM, computer, television, or other visual display) and a smartphone having a camera by using the smartphone camera to scan or capture a special image (e.g., a QR code) presented on the visual interface. The special image serves as a token mark that can graphically encode information about the visual interface and the operator or owner of the device presenting the visual interface. Upon scanning the token mark, an application on the smartphone may establish a connection between the application and a server in communication with the visual interface. The application may then present some of actions provided by the visual interface on the smartphone display so that the user can select actions using the smartphone with the selected actions being performed on the visual interface.

20 Claims, 6 Drawing Sheets

USING A SMARTPHONE FOR REMOTE INTERACTION WITH VISUAL USER INTERFACES

BACKGROUND

Technical Field

The present disclosure generally relates to electronic communications and, more particularly, relates to methods and systems for enabling a smartphone user to interact, using the smartphone, with a visual interface not on the smartphone.

Related Art

Shoppers, consumers, and other users of automated service machines—such as point-of-sale (POS) devices, self checkout terminals at stores, ticket purchasing kiosks or machines, and automatic teller machine (ATM) devices, for example—often interact with a visual display on the device that requires some form of input from the user into the device. For example, POS devices usually have a small numerical keypad entry device near where the user "swipes" a debit or credit card along with a small visual display near the numerical keypad entry device, in addition to the user being able to view a cash register display. ATM machines generally provide a visual display along with keypad entry or other mechanical buttons visually linked to the display. In general, user interaction with these devices may require some form of authentication or authorization information to be entered on the device by the user, and the amount of information or the effort required of the user for information entry given the particular form of the input entry device can sometimes be an inconvenience, or even confusing, to the user. Even when shopping online, consumers often encounter a "checkout" webpage on a merchant's website with forms that need to be filled in with various information—such as a shipping address, billing address, contact information and other such items—and other interactions—such as the user confirming a purchase amount or payment type or the user entering an authentication password—in which providing such information is often repetitive and onerous for typical users even if using their own laptop or personal computer.

BRIEF DESCRIPTION OF THE DRAWINGS

The included drawings are for illustrative purposes and serve only to provide examples of possible systems and methods for the disclosed methods and system for using a smartphone for remote interaction with visual user interfaces. These drawings in no way limit any changes in form and detail that may be made to that which is disclosed by one skilled in the art without departing from the spirit and scope of this disclosure.

DETAILED DESCRIPTION

Figure 1:
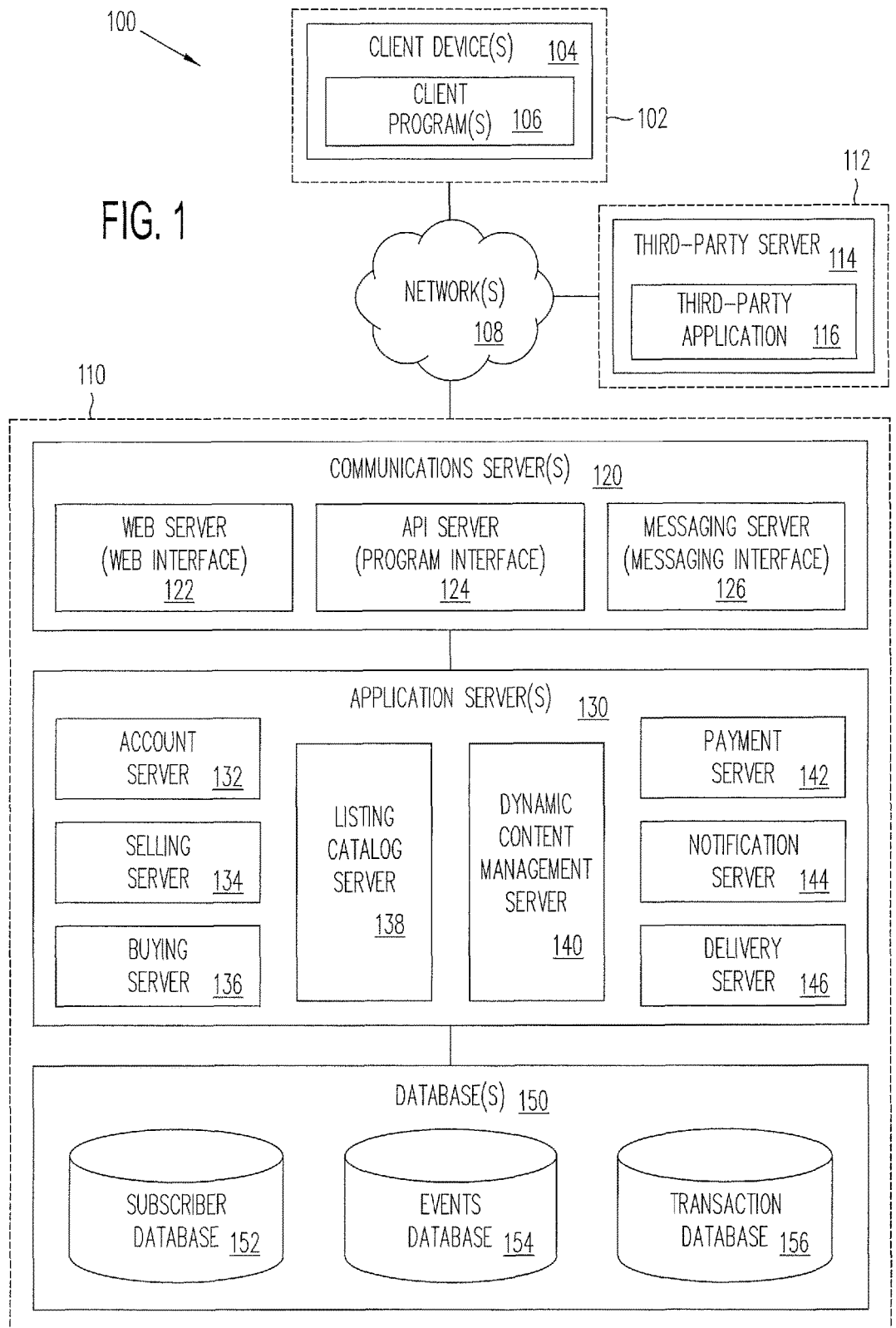
FIG. 1 is a block diagram of a computing system that is adapted for using a smartphone for remote interaction with visual user interfaces, according to an embodiment.

According to one or more embodiments, methods and systems can enable establishing an interaction session between a visual interface on any of a wide range of devices (e.g., POS, ATM, computer, television, or other visual display) and a smartphone having a camera by using the smartphone camera to scan or capture some image, or token mark, presented on the visual interface. The token mark could be or could resemble a QR code, for example. After or upon scanning the token mark, an application on the smartphone may establish a connection between the application and a server in communication with the visual interface, learn (e.g., receive communication from the server) some actions provided by the visual interface, and let the user perform the actions using the smartphone so that the same actions are performed on the visual interface, which may provide visual feedback to the user so that the user can see the actions chosen on the smartphone performed on the visual interface. Embodiments may be applicable in any situation where a customer with a phone needs to interact with a user interface of any kind. Embodiments provide opportunities for enhancing a wide variety of interactive systems without major modifications to the system and are scalable in the sense that embodiments are applicable to a system with many users as well as to a system with fewer users. Embodiments may provide smartphone users with a new feature of usefulness—e.g., the smartphone can now be used to interact with virtually any visual device for a variety of purposes—of the smartphone with virtually no learning required on the part of the user, may provide safe identification or authentication, and may be implemented with unified accessibility support. In one or more embodiments, the smartphone can be used to automatically fill form data in a web browser. In one or more embodiments, the smartphone can be used to authenticate a user using credentials saved previously. While such auto-fill and authenticate functionalities may exist for web browsers and forms, embodiments differ from previous web browser functionalities by giving the user an experience of authenticating or auto-filling using the user's smartphone and a visual contact between the browser or form display and the smartphone. Thus, embodiments may improve user experience with authentication forms and forms that require filling out a large amount of information.

One or more embodiments, thus, may provide unprecedented flexibility in allowing users to use their personal smartphone devices to interact with a broad range of other devices in a wide variety of situations and locations. In one embodiment, a third party server—such as that of a merchant device (such as that of eBay of San, Jose, Calif.) or payment server (such as, for example, PayPal of San Jose, Calif.)—may act as a mediator between the user smartphone device and a client device providing the visual display. A client device may be a merchant device in the examples used to illustrate various embodiments but the client device is not limited to merchant devices, even though the examples and figures most often use a merchant device as an example of a client device. A client device may be, for example, a communications device or processor of any provider of services or information (also referred to as "client") such as a bank or financial institution, or a device connected to a website and displaying a webpage of the website, such as social networking or merchant websites. A service provider acting as such a mediator (such as, for example, PayPal of San Jose, Calif.) may implement one or more embodiments as a service available to customers so that service provider may offer customers a universal mechanism that can be used in: remote control; autocompleting web forms; authentication and identification; using ATMs; checkout at POS; using self-checkout machines; mobile payments and interaction; and gaming, just for a few examples.

In one embodiment applicable to websites, for example, the token mark may be a special graphic mark (e.g., a QR code) displayed on the web page (or data entry form on the web page). The token mark may be scanned by the user with a smartphone, allowing the user to automatically be authenticated on the website—or to automatically fill a data entry form with the user's (possibly sensitive) data without additional effort by the user. Providing such functionality to users' smartphones can be built in on any web form in order to let users enter their data easily and may be implemented as a global, independent service by such a mediator service provider as described above.

According to an embodiment, a computer program product can comprise a non-transitory computer readable medium. The non-transitory computer readable medium can have computer readable and executable code for instructing one or more processors to perform any of the methods disclosed herein.

The one or more memories and one or more hardware processors can be part of the same device, e.g., server. The one or more memories and one or more hardware processors can be part of the different devices, e.g., servers. The one or more memories and one or more hardware processors can be co-located. The one or more memories and one or more hardware processors can be located in different places, e.g., different rooms, different buildings, different cities, or different states. The user device can be a mobile device, such as smart phones, tablet computers, and the like. The user device can be non-mobile or a substantially stationary device. The one or more memories and the one or more hardware processors can be one or more memories or one or more hardware processors of the user device, the other device (see FIG. 3), a server, or any other device or system.

Exemplary applications of apparatuses and methods according to one or more embodiments are described in this section. These examples are being provided solely to add context and aid in the understanding of the embodiments. It will thus be apparent to one skilled in the art that the embodiments may be practiced without some or all of these specific details. In other instances, well known process steps have not been described in detail in order to avoid unnecessarily obscuring the disclosure. Other applications are possible, such that the following examples should not be taken as limiting.

In the following detailed description, references are made to the accompanying drawings, which form a part of the description and in which are shown, by way of illustration, various specific embodiments. Although these embodiments are described in sufficient detail to enable one skilled in the art to practice the embodiments, it is understood that these examples are not limiting, such that other embodiments may be used, and changes may be made without departing from the spirit and scope of the disclosure.

The disclosure relates, in the various described embodiments, to devices, systems and methods involving activities with respect to using a smartphone for remote interaction with visual user interfaces. In various particular embodiments, the systems or methods can involve one or more user devices in communication over a network. Such a network can facilitate a streamlined process involving using a smartphone for remote interaction with visual user interfaces.

While the various examples disclosed herein focus on using a smartphone for remote interaction with visual user interfaces, it will be understood that the various inventive principles and embodiments disclosed herein can be applied to other aspects of electronic commerce, as well.

Systems and Devices

Referring now to FIG. 1, an exemplary embodiment of a computing system adapted for implementing one or more processes involving using a smartphone for remote interaction with visual user interfaces is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a mobile computing device, a PC, and/or any other computing device having computing and/or communications capabilities in accordance with the described embodiments. Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated.

In various embodiments, computing system 100 can include, among other elements, a third party 112, which may comprise or employ a third-party server 114 hosting a third-party application 116. In various implementations, third-party server 314 and/or third-party application 116 may host a web site associated with or employed by a third party 112. For example, third-party server 114 and/or third-party application 116 may enable network-based system 110 to provide client 102 with additional services and/or information, such as using a smartphone for remote interaction with visual user interfaces. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, or configured to provide various services to users that access network-based system 110, including using a smartphone for remote interaction with visual user interfaces. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented using a smartphone for remote interaction with visual user interfaces, application servers 130 of network-based system 110 may provide various online marketplace and electronic commerce services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and a delivery server 146 structured and arranged to provide for using a smartphone for remote interaction with visual user interfaces.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
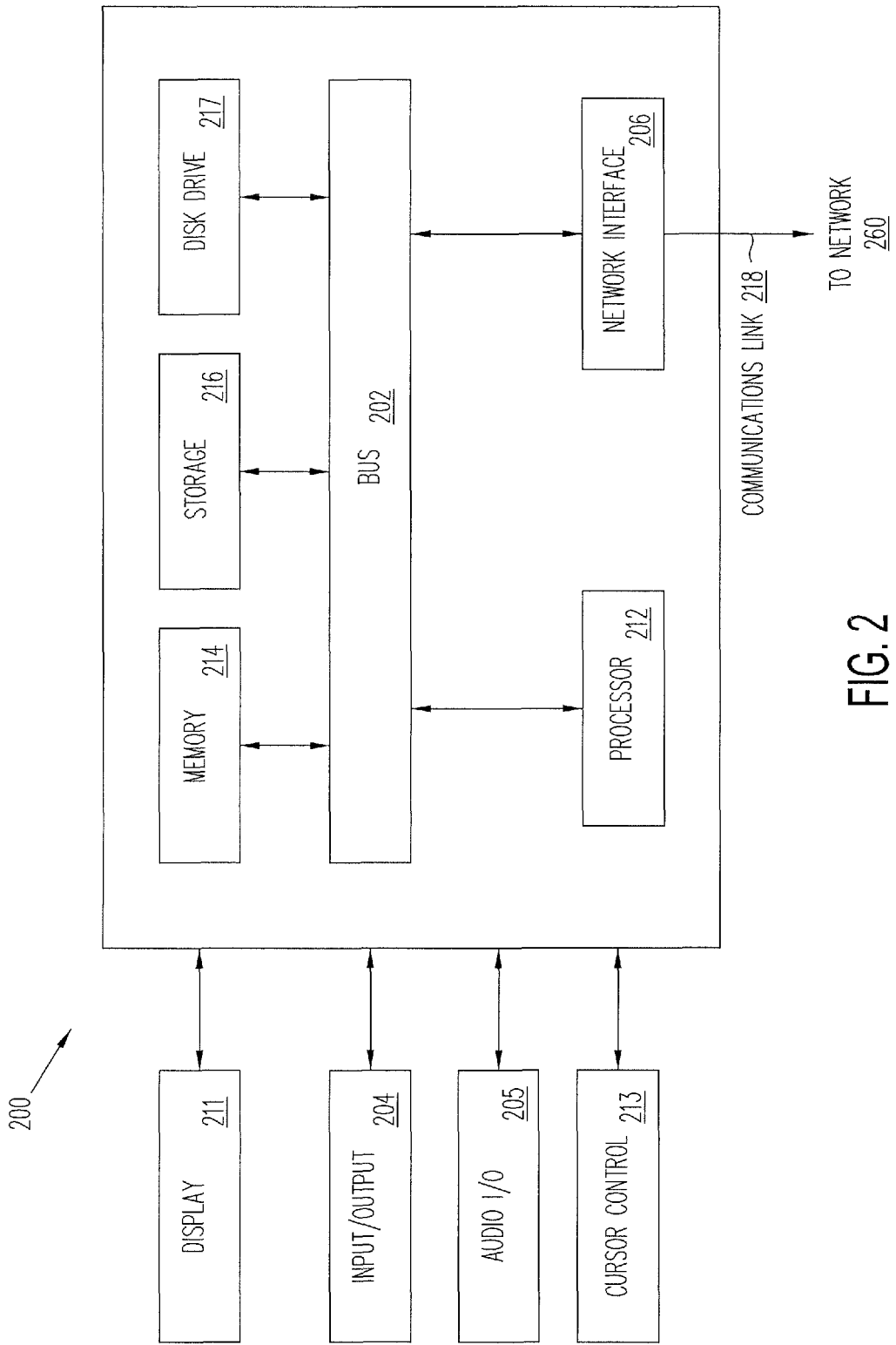
FIG. 2 is a block diagram of an example of a computer system suitable for implementing on one or more devices of the computing system in FIG. 1, according to an embodiment.

Continuing now with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart phone, a computing tablet, a personal computer, laptop, PDA, Bluetooth device, key FOB, badge, etc.) that is capable of communicating with a network. The system for using a smartphone for remote interaction with visual user interfaces may utilize a network computing device (e.g., a network server) capable of communicating with the network. It should be appreciated that each of the devices utilized by users, the system for using a smartphone for remote interaction with visual user interfaces may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In an embodiment, the transmission is wireless, although other transmission mediums and methods may also be suitable. A processor 212, which can be a micro-controller, digital signal processor (DSP), or other hardware processing component, processes these various signals, such as for display on computer system 200 or transmission to other devices over a network 260 via a communication link 218. Processor 212 may also control transmission of information, such as cookies or IP addresses, to other devices.

Components of computer system 200 also may include a system memory component 214 (e.g., RAM), a static storage component 216 (e.g., ROM), and/or a disk drive 217. Computer system 200 may perform specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In an embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments, execution of instruction sequences for practicing the embodiments may be performed by a computer system. In various other embodiments, a plurality of computer systems coupled by a communication link (e.g., LAN, WLAN, PTSN, or various other wired or wireless networks) may perform instruction sequences to practice the embodiments in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code or data, may be stored on one or more computer readable and executable mediums. It is also contemplated that software identified herein may be implemented using one or more general purpose or specific purpose computers or computer systems, networked or otherwise. Where applicable, the ordering of various steps described herein may be changed, combined into composite steps, or separated into sub-steps to provide features described herein.

Using a Smartphone for Remote Interaction with Visual User Interfaces

As will be readily appreciated, the foregoing networks, systems, devices, and numerous variations thereof can be used to implement systems and methods for using a smartphone for remote interaction with visual user interfaces. Aspects not requiring user input can be performed substantially autonomously, such as between the user device and the merchant device. Using a smartphone for remote interaction with visual user interfaces can be performed with a server or server cloud (referred to, e.g., as a visual interface control server). The visual interface control server (or server cloud) can be paired with third-party systems or servers, such as that of a merchant device (such as that of eBay of San, Jose, Calif.) or payment server (such as, for example, PayPal of San Jose, Calif.) in order to perform "special" operations like payment, registration, booking, for example, although such cooperation is not essential for a functional system for remote interaction with visual user interfaces. The memories and/or processors can thus be memories and/or processors of the user device, another device, and/or the server, for example.

As noted with respect to FIG. 2 above, a computer system 200 can include one or more processors 212 and one or more memories or storage devices 214, 216. Such a computer system 200 can be part of a user device, part of one or more servers on a network-based system, or some combination thereof. In particular, a given computing system can include a first memory device or storage component adapted to store information regarding one or more users of the system, as well as a second memory device or storage component adapted to store information regarding an online merchant.

In addition, one or more processors 212 can be adapted to facilitate using a smartphone for remote interaction with visual user interfaces. Further functionality of the one or more processors 212 can include facilitating using a smartphone for remote interaction with visual user interfaces.

Figure 3:
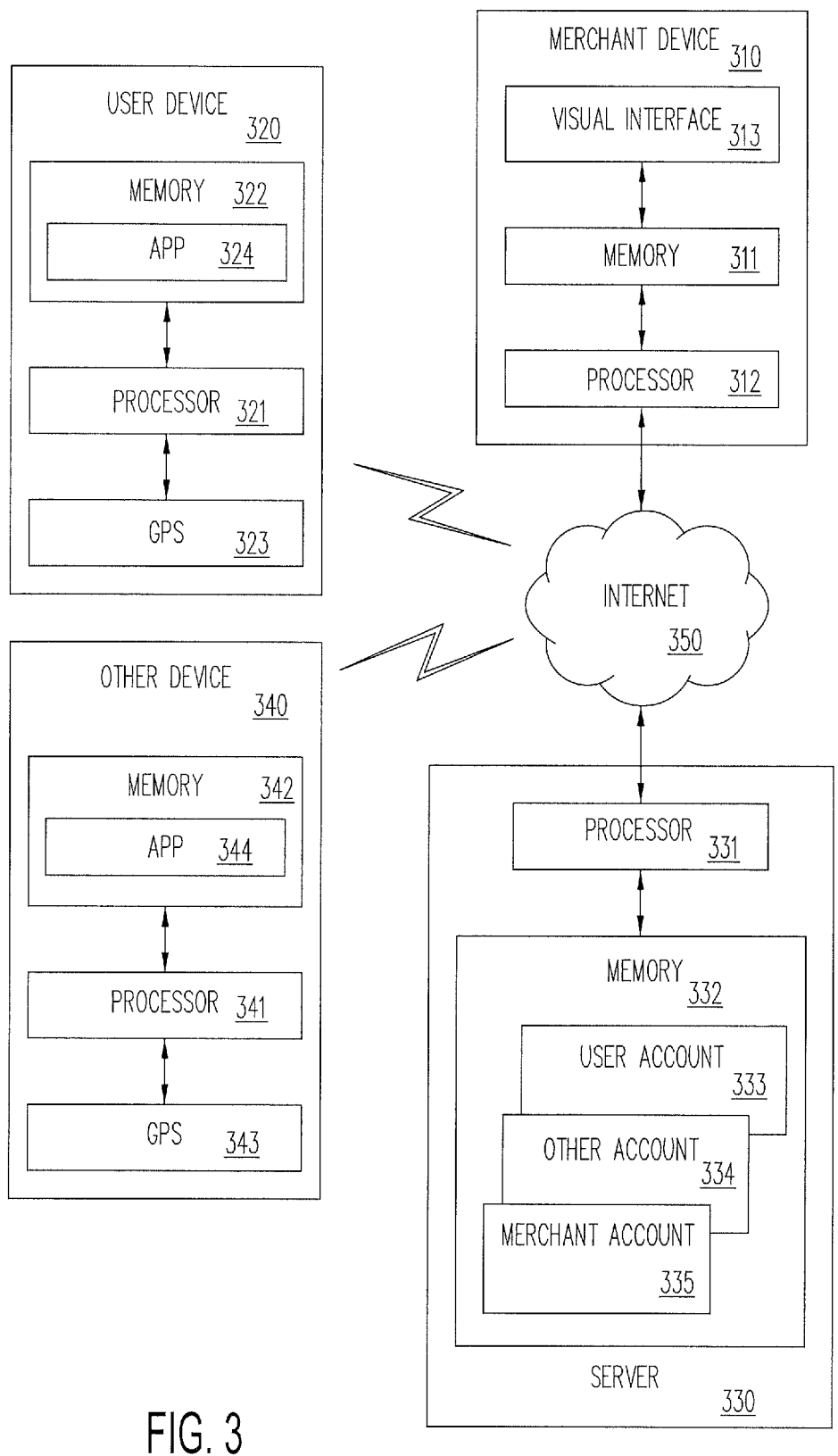
FIG. 3 is a block diagram of a system for using a smartphone for remote interaction with visual user interfaces, according to an embodiment.

FIG. 3 is a block diagram of a system for using a smartphone for remote interaction with visual user interfaces, according to an embodiment. The system can include a merchant device 310, a mobile device 320, a payment server 330, or other device 340. The functions and components discussed herein can be split and shared among the merchant device 310, the mobile device 320, the payment server 330, and any other devices 340 or systems, as desired.

The merchant device 310 can comprise a merchant checkout terminal, a computer, or server, for example. The merchant device 310 can be a merchant device of any retailer, or provider of services such as dining or car maintenance, for example. The merchant device 310 can include a memory 311 and a processor 312. The merchant device 310 can be used for processing purchases from the merchant.

The merchant device 310 can be used, for example, for using a smartphone for remote interaction with visual user interfaces.

The mobile device 320 can be carried by the user. The mobile device 320 can comprise a cellular telephone, a smart telephone, a hand held computer, a laptop computer, a notebook computer, or a tablet computer, for example. The mobile device 320 can include a processor 321, a memory 322, and a global positioning system (GPS) 323.

The mobile device 320 can be used for routine telephone calls, text messaging, web browsing, and the like. The mobile device 320 can be used, for example, using a smartphone for remote interaction with visual user interfaces.

An app 324 can be stored in the memory 322 and executed by the processor 321. The app 324 can be used, as described above, using a smartphone for remote interaction with visual user interfaces.

The other device 340 can be different from, identical to, or similar to the user device 320. The other device 340 can be carried by the user. The other device 340 can comprise a cellular telephone, a smart telephone, a hand held computer, a laptop computer, a notebook computer, or a tablet computer, for example. The other device 340 can include a processor 341, a memory 342, and a global positioning system (GPS) 343. The other device 340 can be used for routine telephone calls, text messaging, web browsing, and the like. An app 344 can be stored in the memory 342 and executed by the processor 341. The app 344 can be used for facilitating using a smartphone for remote interaction with visual user interfaces.

The server 330 can include a visual interface control server. Server 330 may include a server or server cloud that serves as a mediator between the user device (e.g., smartphone) and an arbitrary device with visual interface (e.g., ATM, POS terminal, computer, television, automated store checkout machine, or any other device providing a visual interface display to a user or customer). The visual interface control server (or server cloud) can be paired with third-party systems or servers, as described above in order to perform "special" operations. Server 330 also may further comprise a server of a payment provider, such as PayPal, Inc, Thus, the server 330 can be a VIC server and may include a server cloud as well as a payment server. The server 330 can be a single server or can be a plurality of servers. The server 330 can include one or more processors 331 and one or more memories 332. The memory 332 can be a memory of the server 330 or a memory that is associated with the server 330. The memory 332 can be a distributed memory. The memory 332 can include storage for a user account 333, other account 334, and a merchant account 335 and for relationships between and among the user account 333, the other account 334, and the merchant account 335. Storage for such relationships between and among the user account 333, the other account 334, or the merchant account 335 can include routine purchase information, such as credit or purchase limits, purchase histories, lists of previous purchases by the user at the merchant, previous ratings by the user of a previously encountered service providing person of the merchant, information about specials provided by the merchant that the user may be interested in, and the like as described above.

The server 330 can be used for any combination of relaying, filtering, and delaying communications between merchant device 310, user device 320, other device 340, and server 330 that may facilitate using a smartphone (e.g., user device 320) for remote interaction with visual user interfaces, e.g., visual interface 313 of merchant device 310.

Generally, the merchant device 310, the mobile device 320, and the server 330 (e.g., a visual interface control server, including also a server cloud or a payment server) can perform functions discussed herein. That is, at least to some extent, a function that is discussed herein as being performed via a particular one of these devices can be performed by a different one of these devices, by a combination of these devices, or by other devices.

The merchant device 310, the mobile device 320, the other mobile devices 330, and the server 330 can communicate with one another via a network, such as the Internet 350. The merchant device 310, the mobile device 320, the other mobile devices 340, and the server 330 can communicate with one another via one or more networks, such as local area networks (LANs), wide area networks (WANs), cellular telephone networks, and the like. The merchant device 310, the mobile device 320, the other mobile devices 340, and the server 330 can communicate with one another, at least partially, via one or more near field communications (NFC) methods or other short range communications methods, such as infrared (IR), Bluetooth, WiFi, and WiMax.

The one or more memories and the one or more processors can be one or more memories or one or more processors of the merchant device 310, the user device 320, the server 330, the other device 340, and/or any other device or system. Memories or processors from any number of devices, systems, and entities can cooperate to perform methods disclosed herein of using a smartphone for remote interaction with visual user interfaces.

Figure 4:
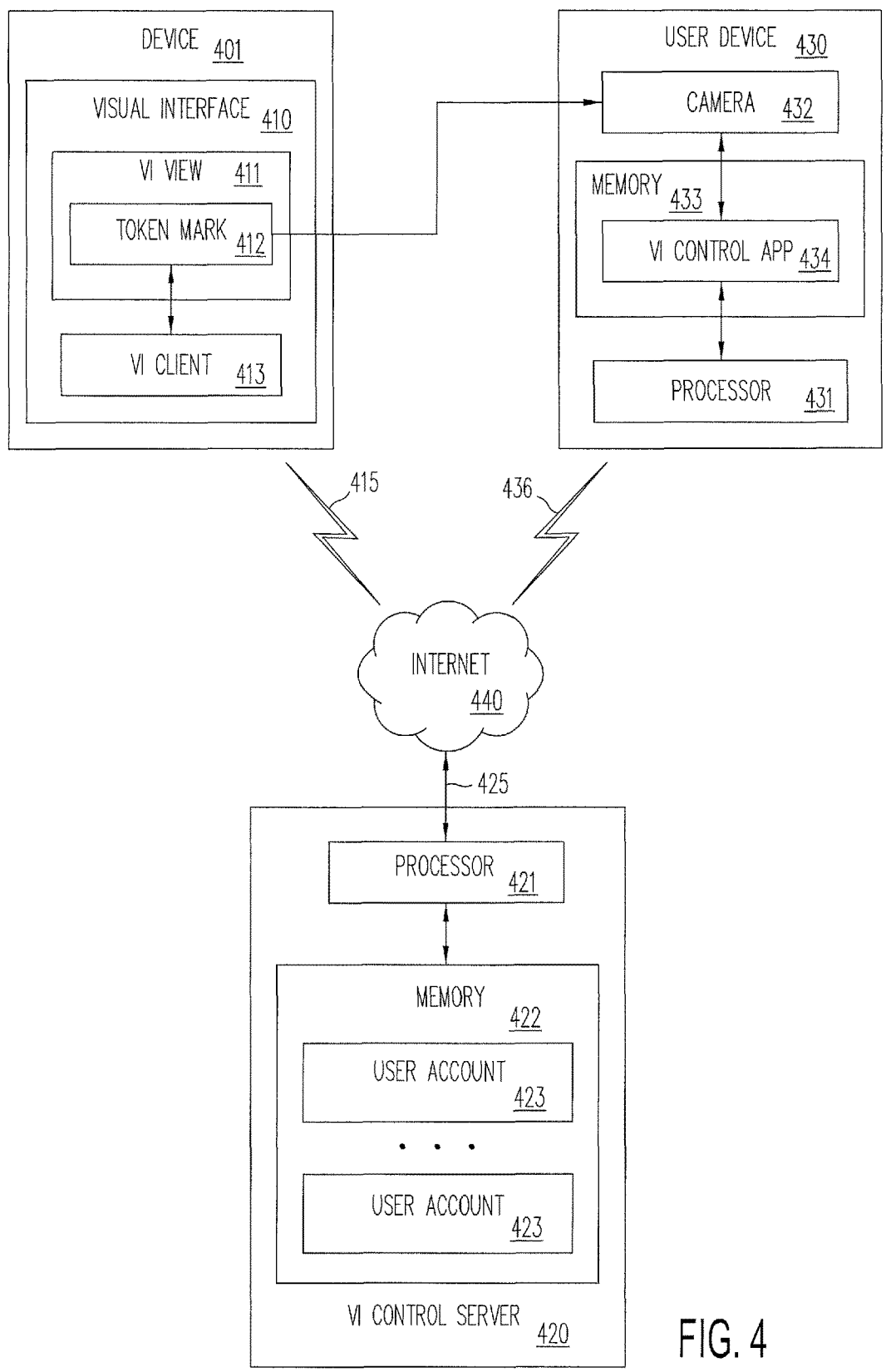
FIG. 4 is a block diagram of a system for using a smartphone for remote interaction with visual user interfaces, according to one embodiment.

FIG. 4 illustrates a portion of a system for using a smartphone for remote interaction with visual user interfaces, according to one embodiment. The system may include the following subsystems: 1) an arbitrary device 401 (e.g., any electronic device displaying a web browser or web page, ATM, POS terminal, automated store checkout machine, or any other device providing a visual interface display to a user or customer) with a visual interface 410 and a network connection 415; 2) a user device 430 (e.g., smartphone) with a camera 432 to establish visual connection with visual interface 410, and a network connection 436; and 3) a server 420 (e.g., a server or server cloud) available to the device 401 and user device 430 and in communication with them via a network connection 425.

The server or server cloud 420 may perform any or all of the following functions, operations, and processes:

1) provide an API for either or both of arbitrary device 401 and user device 430 (e.g., smartphone) for secure interactions;

2) serve as a mediator for the established connection between device 401 and user device 430 by creating a secure session;

3) pass a list of commands valid for device 401 to user device 430;

4) pass the user's choice sent through a smartphone application, e.g., VI control app 434, via the sever 420, to the device 401; and 5) terminate the secure session on demand from either the arbitrary device 401 side, the smartphone, user device 430 side, or after a timeout. The server or server cloud 420 may support these functions, operations, and processes using a single database (e.g., database 150 shown in FIG. 1 or, for example, memory 422 and information on user accounts 423) and software executed for example by processor 421.

Methods

Figure 5:
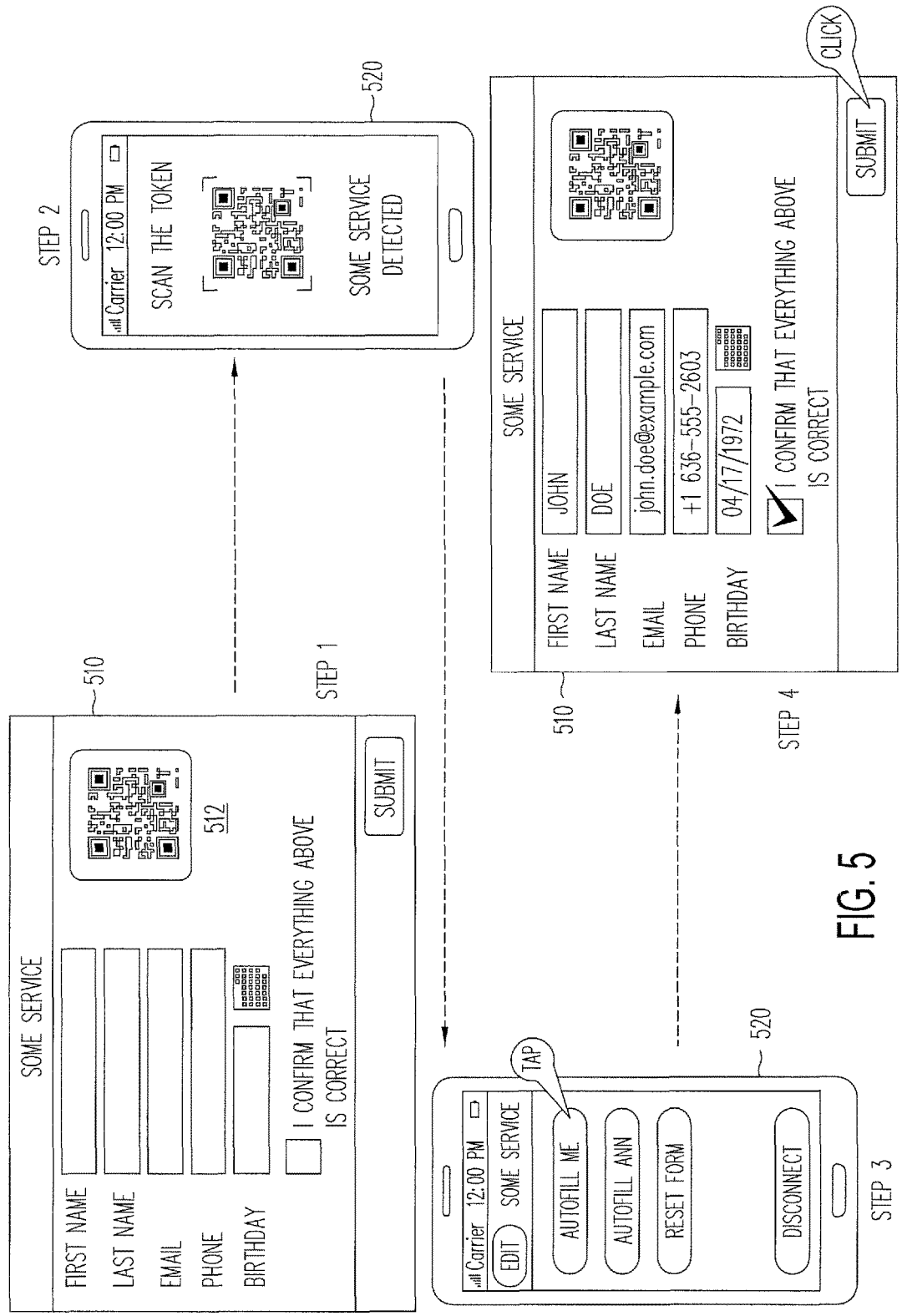
FIG. 5 is a sequence diagram illustrating communications between a visual user interface and a user smartphone display for using a smartphone for remote interaction with visual user interfaces, according to an embodiment.

FIG. 5 illustrates a sequence of communications between a visual user interface and a user smartphone display for describing an example of operation of a system (e.g., system 100) for using a smartphone for remote interaction with visual user interfaces, according to an embodiment.

Visual interface display 510 (showing an example of a web browser data form) may be any visual interface display such as may be found, for example, on a web browser, ATM, POS, automated store checkout machine, or any other device 401 providing a visual interface display to a user or customer. User device (e.g., smartphone) display 520 is a visual interface display such as may be found on any of a variety of commercially available smartphones or other mobile user devices 430.

At the first instance in FIG. 5 of visual interface display 510 (marked "step 1" in FIG. 5) a visual interface on an arbitrary device 401 (such as a web browser capable device, ATM, or POS terminal, see FIG. 4) may be open. For example, the user may open the interface on a web browser; or insert a card into an ATM, triggering the interface to appear; or swipe a card at a POS terminal. Visual interface display 510 may open a particular visual interface view (e.g., VI view 411) of which there may be several for any particular visual interface 410 (see FIG. 4). Visual interface display 510 depicted in FIG. 5 shows a personal information data entry form by way of illustrative example. Included in the VI view of visual interface display 510 shown in FIG. 5 is token mark 512, e.g., an instance of token mark 412 of VI view 411, which for illustrative purposes resembles a QR code. Token mark 512 may graphically encode several types of information including, for example, a visual interface identifier that identifies the visual interface display (e.g., bank's ATM intro display, merchant website data entry form, etc.) and a client identifier that identifies the client account (e.g., a particular bank, store, or website).

When VI view 411 is opened, a visual interface control client (e.g., VIC client 413, which may be resident on device 401, for example) may render token mark 412 for visual interface display 510. Token mark 412 may graphically encode, for example, a VI identifier, a VI view identifier, and a randomly generated salt (as known in the art of cryptography). A token associated with token mark 412 may be created by either of the VIC client 413 or a VIC server 420 which may be in communication with the VIC client 413. Any token associated with token mark 412 may have a limited lifetime, and may either expire within the lifetime period or extend its lifetime on every command from a VI control application (e.g., VIC app 434, which may be resident on user device 430, for example). Concurrently, VIC client 413 keeps listening (e.g., network communication via Internet 440 between device 401 and VIC server 420 is maintained) to the VI control server 420 for an authentication signal.

At the first instance in FIG. 5 of user device 430 (e.g., smartphone) display 520 (marked "step 2" in FIG. 5) a user may have opened a VIC application 434 (e.g., implemented as a smartphone app on the user device 430) that can use the smartphone camera 432 to scan visual images from the surrounding environment. In particular, the user may use the smartphone and VIC app 434 to scan token mark 512 on visual interface display 510, as illustrated in FIG. 5 by an image of token mark 512 on the user device display 520. Once the token mark 512 has been scanned by the smartphone user device (e.g., user device 430) the following processes may be performed: an authentication signal may be sent to the VIC server 420; the token associated with token mark 512 may be updated with smartphone device information that unambiguously identifies the smartphone (e.g., user device 430) or the user; the VIC client 413 (e.g., on device 401) may receive an authentication signal and an interaction session between the user device (e.g., user device 430) and the client device (e.g., device 401) may be established; the VIC app 434 may detect the connected visual interface (e.g., visual interface 410) and display its name (e.g., "Some Service" as shown in FIG. 5); and the VIC app 434 may switch into interaction session mode, as described at the second instance of user device display 520 in FIG. 5.

At the second instance in FIG. 5 of user device 430 (e.g., smartphone) display 520 (marked "step 3" in FIG. 5) an interaction session may be established with the VIC app 434 in interaction session mode. With the VIC app 434 in interaction session mode, the following processes may be performed: the VIC app 434 may receive a list of commands supported by the current VI view 411 and display the commands as a button set on the user device display 520, as seen in the example display in FIG. 5; one of the commands, whether in the list of supported commands or not, may be a "disconnect" command (as seen in the example user device display 520 at step 3 in FIG. 5) which may instantly terminate the interaction session; in case the visual interface 410 supports creating its own commands, an "Edit" button may be displayed on the user device display 520; once one of the buttons on the user device display 520 is tapped (e.g., the user selects an option), an action signal may be transferred to the VIC client 413 (e.g., on device 401) over the VIC server 420—in other words, communication is provided between the user device (e.g., user device 430) and the client device (e.g., device 401) so that visual interface 410 receives the selected option from the user device display 520 as shown by the example at the second instance in FIG. 5 of visual interface display 510 (marked "step 4" in FIG. 5). The interaction session may continue—as may be illustrated by repeating steps 3 and 4 of FIG. 5—with the user selecting options or tapping buttons on the user device display 520 and seeing the selected option or command performed on visual interface display 510, until ended, for example, by selection of the disconnect button on user device display 520.

Figure 6:
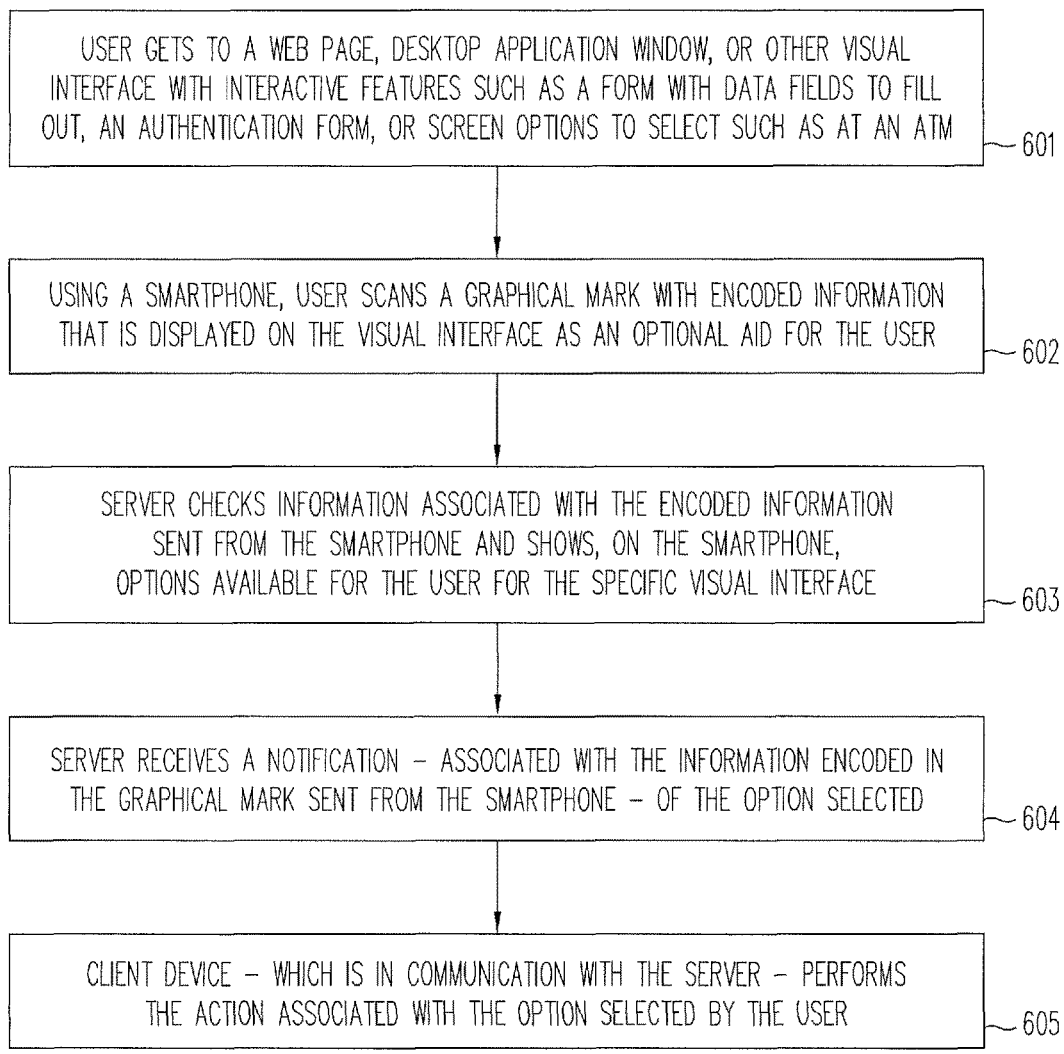
FIG. 6 is a flow chart illustrating a method for using a smartphone for remote interaction with visual user interfaces, according to an embodiment.

FIG. 6 illustrates an example of a method for using a smartphone for remote interaction with visual user interfaces according to one or more embodiments. Note that one or more of the steps described herein may be combined, omitted, or performed in a different order, as desired or appropriate.

At step 601, a user may arrive at a situation in which the user views a web page, desktop application window or other visual interface display (e.g., visual interface display 510) with an interactive feature such as a form with data fields to fill out or an authentication form. The visual interface (e.g., visual interface 410) presenting the display could be that of an ATM or store self checkout terminal, for example, or any device (such as arbitrary device 401) that provides options to select on screen.

At step 602, the user may use a smartphone (e.g., user device 430) to scan a graphical mark (e.g., token mark 412, 512) with an encoded security token that is displayed next to the fields of the visual interface. The graphical mark may be a QR code, for example, or similar type of encoding such as bar codes or two-dimensional bar codes. The graphical mark may be displayed as an optional aid for helping the user, but need not be used if, for example, the user does not have a smartphone with a camera available for scanning the graphical mark. The visual interface may maintain an option for the user to use input of the device on which the visual interface is displayed. By using the graphical mark, however, the user may—instead of remembering all the data that should be entered—use a smartphone (e.g., user device 430) with a camera (e.g., camera 432) to run an app (e.g., VI control app 434 executing on processor 431) that scans the graphical mark and sends the token or other information encoded in the mark to a dedicated server (e.g. server or server cloud 420).

At step 603, the server (e.g. server or server cloud 420) may check the information associated with the token or other information encoded in the graphical mark to determine the options available for the user for the specific form. The options may be displayed on the smartphone screen (e.g., user device display 520) so that the user may select any of the options by tapping at one of them on the smartphone screen rather than using the conventional input of the device on which the visual interface is displayed. In an alternative embodiment, custom options could be created for a future use.

At step 604, once the user selects one of the options, the server (e.g. server or server cloud 420) may receive a notification—associated with the token or other information encoded in the graphical mark—of the option selected.

At step 605, at the client device (e.g., device 401 executing VI client 413) a script or applet may be scanning the server (e.g. server or server cloud 420) continuously and, once notification appears, may perform the action associated with the option selected by the user. For the user, a form on the visual interface may appear as if it has been "magically" filled out (or the authentication has been performed in an alternative example) without any further effort by the user other than selecting the appropriate option on the user's smartphone (e.g., user device 430). Using the smartphone through scanning the graphical mark may work transparently to the user in that if the user decides not to use this feature or has no smart phone available, all that is needed is filling out the form as would ordinarily be accomplished using the visual interface and input devices.

In implementation, at least some of the various embodiments may comprise a personal computing device, such as a personal computer, laptop, PDA, cellular phone or other personal computing or communication devices. Either of the visual interface control server (e.g., VIC server or server cloud 420) or payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In an embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the embodiments.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

As used herein, the term "store" can include any business or place of business. The store can be a brick and mortar store or an online store. Using a smartphone for remote interaction with visual user interfaces can be used for either brick-and-mortar store purchases or online purchases. Examples of stores can include supermarkets, discount stores, book stores, convenience stores, restaurants, gas stations, auto repair shops, and movie theaters. The store can be any person or entity that sells a product or provides a service.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut. Products can be purchased from brick-and-mortar stores or from online stores.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone.

The foregoing disclosure is not intended to limit the disclosure to the precise forms or particular fields of use disclosed. It is contemplated that various alternate embodiments and/or modifications, whether explicitly described or implied herein, are possible in light of the disclosure. Having thus described various example embodiments of the disclosure, persons of ordinary skill in the art will recognize that changes may be made in form and detail without departing from the scope of the disclosure. Thus, the disclosure is limited only by the claims.

What is claimed is:

1. A system, comprising:
one or more processors; and
one or more storage devices storing instructions that, responsive to execution by the one or more processors, cause the system to perform operations comprising:
communicating, using a visual control server, with a visual interface control client application at a client device effective to cause the client device to display a token mark associated with a visual interface displayed by the client device, the visual interface comprising one or more data entry fields;
receiving, from a visual interface control application at a user device, information associated with the token mark displayed by the client device;
establishing an interaction session between the user device and the client device;
determining, using the information, one or more selectable options associated with the visual interface for interacting with the one or more data entry fields displayed by the client device;
forwarding, to the user device, the one or more selectable options effective to cause the one or more selectable options to be displayed on the user device;
receiving, from the user device, a notification of selection of one of the one or more selectable options;
forwarding the notification of selection to the client device effective to cause the client device to perform an action associated with the notification, the action comprising an interaction with at least one of the one or more data entry fields;
receiving, from the user device, a disconnect command; and
terminating the interaction session between the user device and the client device.

2. The system of claim 1, wherein said operations further comprise:
receiving an authentication signal from the user device; and
forwarding the authentication signal to the client device.

3. The system of claim 1, wherein said receiving the information associated with the token mark comprises:
receiving, from the user device, a visual interface identifier that identifies the visual interface displayed by the client device.

4. The system of claim 1, wherein said receiving the information associated with the token mark comprises receiving an image of the token mark, wherein the token mark includes user device identification information graphically encoded in the token mark.

5. The system of claim 1, wherein said receiving the information associated with the token mark further comprises:
receiving, from the user device and via the information associated with the token mark, user account information, and wherein the operations further comprise:
using the user account information to provide the client device with additional user information from a third-party server.

6. The system of claim 1, wherein said receiving the information associated with the token mark comprises receiving, from the user device, a visual interface view identifier that identifies a particular virtual interface view displayed by the client device, the particular visual interface view comprising at least one interactive feature, and
wherein said determining the one or more selectable options associated with the visual interface comprises determining the one or more selectable options based, at least in part, on the visual interface view identifier, at least one option of the one or more selectable options comprising an interaction with the at least one interactive feature.

7. The system of claim 1, wherein said receiving the information associated with the token mark further comprises:
receiving a client identifier that identifies a client account associated with the client device.

8. The system of claim 1, wherein said operations further comprise:
receiving, from the user device, user account information associated with the user device;
determining, based at least in part on the user account information, whether a restriction exists that prevents a transaction between the user device and the client device from being approved; and
responsive to determining the transaction is approved, sending a notification to the client device or the user device that indicates the transaction is approved.

9. A method, comprising:
receiving, using a visual control server and from a visual interface control application at a user device, token information associated with a token mark displayed on a client device and scanned by the user device, the token information comprising a visual interface view identifier that identifies a particular view displayed at the client device;
establishing an interaction session between the visual interface control application at the user device and a visual interface control client application at the client device based, at least in part, on the token information;
determining, using the token information, one or more selectable options associated with the particular view for interacting with the particular view based, at least in part, on the visual interface view identifier, at least one option of the one or more selectable options comprising an interaction with an interactive feature displayed on the particular view;
forwarding, to the user device, the one or more selectable options effective to cause the one or more selectable options to be displayed at the user device;
receiving, from the user device, a notification that the at least one option has been selected; and
forwarding, to the client device, the notification that the at least one option has been selected effective to cause the client device to perform the interaction with the interactive feature and provide visual feedback of the interaction;
receiving, from the user device, a disconnect command; and
terminating the interaction session between the user device and the client device.

10. The method of claim 9, wherein said receiving the token information further comprises:
receiving, from the user device, an image of the token mark with the token information graphically encoded in the token mark.

11. The method of claim 10, wherein the image of the token mark includes graphically encoded information that identifies the user device.

12. The method of claim 10, wherein the token mark includes graphically encoded information associated with a client identifier that identifies a client account associated with the client device.

13. The method of claim 9, wherein the interaction comprises filling at least one data entry field in the particular view displayed at the client device.

14. The method of claim 9, further comprising:
receiving, from the user device, an authentication signal; and
performing said establishing the interaction session based, at least in part, on the authentication signal.

15. The method of claim 9, wherein said establishing the interaction session further comprises:
providing one or more application programming interfaces (APIs) to the user device and the client device; and
interacting with the user device and client device via the one or more APIs to establish the interaction session.

16. The method of claim 9, further comprising:
identifying a timeout associated with the interaction session; and
terminating the interaction session based, at least in part, on the timeout.

17. A storage device storing instructions, that responsive to execution by one or more processors of a computing device, cause the computing device to perform operations comprising:
receiving, using a visual control server and from a visual interface control application at a user device, token information associated with a token mark that is displayed on a client device and scanned by the user device, the token information comprising a visual interface view identifier that identifies a particular view displayed at the client device;
establishing an interaction session between the visual interface control application at the user device and a visual interface control client application at the client device based, at least in part, on the token information;
determining, using the token information, one or more selectable options associated with the particular view for interacting with the particular view based, at least in part, on the visual interlace view identifier, at least one option of the one or more selectable options comprising an interaction with an interactive feature displayed on the particular view;
forwarding, to the user device, the one or more selectable options effective to cause the one or more selectable options to be displayed at the user device;
receiving, from the user device, a notification that the at least one option has been selected;
forwarding, to the client device, the notification that the at least one option has been selected effective to cause the client device to perform the interaction with the interactive feature and provide visual feedback of the interaction;
receiving, from the user device, a disconnect command; and
terminating the interaction session between the user device and the client device.

18. The storage device of claim 17, wherein said receiving the token information further comprises:
receiving, from the user device, an image of the token mark with the token information graphically encoded in the token mark.

19. The storage device of claim 18, wherein the image of the token mark includes graphically encoded information that identifies the user device.

20. The storage device of claim 18, wherein the token mark includes graphically encoded information associated with a client identifier that identifies a client account associated with the client device.

* * * * *